(12) United States Patent
Motonaga (10) Patent No.: US 11,613,006 B2
(45) Date of Patent: Mar. 28, 2023

(54) ROBOT APPARATUS, CONTROL METHOD OF ROBOT APPARATUS, POWER TRANSMISSION MODULE, POWER RECEPTION MODULE, POWER SUPPLY METHOD, ARTICLE MANUFACTURING METHOD USING ROBOT APPARATUS, AND STORAGE MEDIUM

(71) Applicant: CANON KABUSHIKI KAISHA, Tokyo (JP)

(72) Inventor: Yusaku Motonaga, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 78 days.

(21) Appl. No.: 16/714,572

(22) Filed: Dec. 13, 2019

(65) Prior Publication Data

US 2020/0198127 A1 Jun. 25, 2020

(30) Foreign Application Priority Data

Dec. 25, 2018 (JP) .............................. JP2018-241865

(51) Int. Cl.
| | |
|---|---|
| *H02J 50/80* | (2016.01) |
| *H02J 50/50* | (2016.01) |
| *B25J 9/12* | (2006.01) |
| *H02J 50/10* | (2016.01) |
| *H02P 27/06* | (2006.01) |

(52) U.S. Cl.
CPC ............... *B25J 9/126* (2013.01); *H02J 50/10* (2016.02); *H02P 27/06* (2013.01)

(58) Field of Classification Search
CPC ................................. H02M 7/537; H02J 50/80
See application file for complete search history.

(56) References Cited

U.S. PATENT DOCUMENTS

2017/0098964 A1* 4/2017 Sakata .................... H02J 50/80
2019/0176348 A1* 6/2019 Bingham ............. B25J 15/0004

FOREIGN PATENT DOCUMENTS

| | | |
|---|---|---|
| JP | H07100786 A | 4/1995 |
| JP | 2008-160994 A | 7/2008 |
| JP | 2013-13964 A | 1/2013 |
| JP | 2016-17164 A | 2/2016 |
| JP | 2017-070180 A | 4/2017 |
| JP | 2018-93706 A | 6/2018 |

* cited by examiner

*Primary Examiner* — Kawing Chan
*Assistant Examiner* — Charles S Laughlin
(74) *Attorney, Agent, or Firm* — Canon U.S.A., Inc. IP Division (57) ABSTRACT

A robot apparatus equipped with a driving source includes a power transmission module configured to transmit power to the driving source, a power reception module configured to receive the power transmitted by the power transmission module, and a control device configured to control a power transmission start timing in such a manner that the power reception module receives predetermined power at a timing at which the driving source operates.

31 Claims, 9 Drawing Sheets

ROBOT APPARATUS, CONTROL METHOD OF ROBOT APPARATUS, POWER TRANSMISSION MODULE, POWER RECEPTION MODULE, POWER SUPPLY METHOD, ARTICLE MANUFACTURING METHOD USING ROBOT APPARATUS, AND STORAGE MEDIUM

BACKGROUND

Field

The present disclosure relates to a robot apparatus.

Description of the Related Art

In recent years, a robot apparatus having a multi-joint, articulating robot arm has been used in a production line for manufacturing products. This type of robot arm can provide tools at the tip of the robot arm as an end effector, such as a robot hand serving as a gripping device or another tools different from the robot hand. This type of robot arm can be used to manufacture an article, such as an industrial product or its components, by using such tools at the end of the robot arm to, for example, operate a workpiece.

Furthermore, a wireless power supply technology that can transmit power wirelessly (i.e., contactlessly) to each of a plurality of driving sources has been developed. Such technology has been introduced to a driving source that drive each of a plurality of joints of the articulating robot arm described above, as well as to a driving source that rotates the end effector of the robot arm. For example, Japanese Patent Application Laid-Open No. 2018-93706 discloses a contactless, wireless power supply device including a power transmission module and a power reception module. The driving sources that drive each joint of the robot arm described above and the end effector of the robot arm are rotated.

As a result of such wireless power transmission, each joint of the robot arm and the end effector of the robot arm used in the above described robot apparatus can accordingly be rotationally driven without the limitations associated with wiring, for example, a need for a power cable to supply power to the driving sources.

By removing the need for a wired connection, the technology enables the robot apparatus to perform a wider variety of postures and/or operations and to perform tasks more easily that were difficult in the past. Accordingly, in some cases, task time can be shortened and more advanced work can be realized.

SUMMARY

According to various embodiments of the present disclosure, a robot apparatus equipped with a driving source includes a power transmission module configured to transmit power to the driving source, a power reception module configured to receive the power transmitted by the power transmission module, and a control device configured to control the power to be transmitted by the power transmission module in such a manner that the power reception module receives target power at a timing at which the driving source drives.

Further features will become apparent from the following description of exemplary embodiments with reference to the attached drawings.

DESCRIPTION OF THE EMBODIMENTS

As discussed above, a technique for wirelessly supplying power to drive units of a robot arm wirelessly (contactlessly) has been developed. However, a wireless power supply system, as discussed in Japanese Patent Application Laid-Open No. 2018-93706, has the following issue.

In power transmission performed in a wireless power supply module discussed in Japanese Patent Application Laid-Open No. 2018-93706, power is transmitted wirelessly. The power transmission is performed in such a manner that a direct-current power is converted into a high-frequency alternating-current power through an inverter circuit. The alternating-current generates a magnetic field when going through a power transmission coil. The magnetic field is then converted into an alternating-current at a power reception coil.

Japanese Patent Application Laid-Open No. 2018-93706 discusses a technique of controlling the power of the wireless power supply module in a manner that is responsive to the power necessary for a driving source so that no unnecessary power is wasted in, for example, the inverter circuits, while power transmission and power reception are performed. The technique is referred to as power management.

As one power management technique, Japanese Patent Application Laid-Open No. 2018-93706 discusses a technique for supplying, to a control circuit of the power transmission coil, data concerning load variation at the driving source connected to the power reception coil. Such so called feedback control can be used adjust the amount of transmitted power to compensate for the variation in power needs at the driving source connected to the power reception coil.

However, as described above, in a case where feedback power control is performed upon occurrence of a load variation at the driving source, temporary power shortages can result in some situations because performing the power control cannot be finished immediately after the power load variation has occurred.

Figure 9:
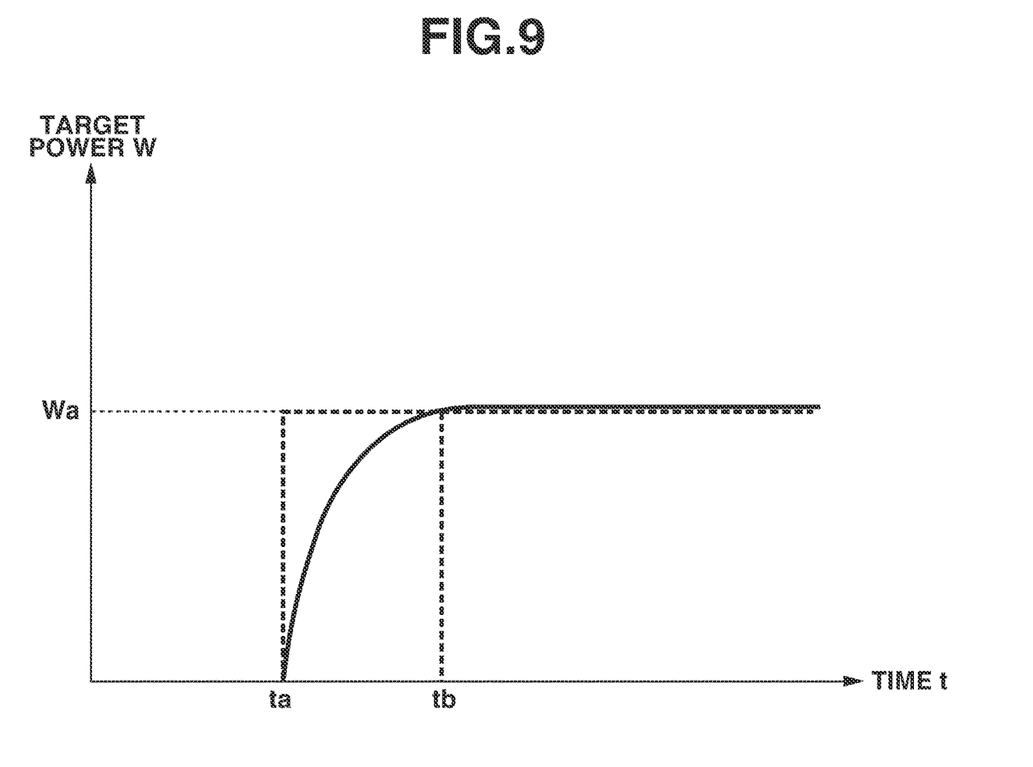
FIG. 9 is a graph illustrating a power timing chart for describing a conventional issue.

FIG. 9 is a graph illustrating a power timing chart to describe the above issue in detail. In FIG. 9, the horizontal axis indicates time t, and the vertical axis indicates consumable power W. A solid line indicates the variation of power.

In FIG. 9, Wa represents power necessary for driving a predetermined driving source. Time ta represents a time at which power control starts due to feedback control as power management.

As illustrated in FIG. 9, when a load variation occurs in the driving source, power supply starts to increase the power from the time ta. However, the power does not instantaneously reach the target power Wa at the time ta. The power increases gradually and then reaches the target power Wa at time tb.

In this situation, the power will not reach the target power Wa between times to and tb, resulting in a temporary power shortage.

Various embodiments of the present disclosure provide a robot apparatus with a wireless power supply system, where a power shortage can be prevented by reduction of unnecessary power usage.

Exemplary embodiments of the present disclosure will be described below with reference to the accompanying drawings. Configurations to be described below are exemplary. Those skilled in the art may appropriately alter small details of the configurations without departing from the scope of the spirit of the present disclosure. In addition, numerical values that are described in connection with descriptions of the present exemplary embodiments are merely reference numerical values. Thus, the present invention is not limited to these numerical values.

Figure 1:
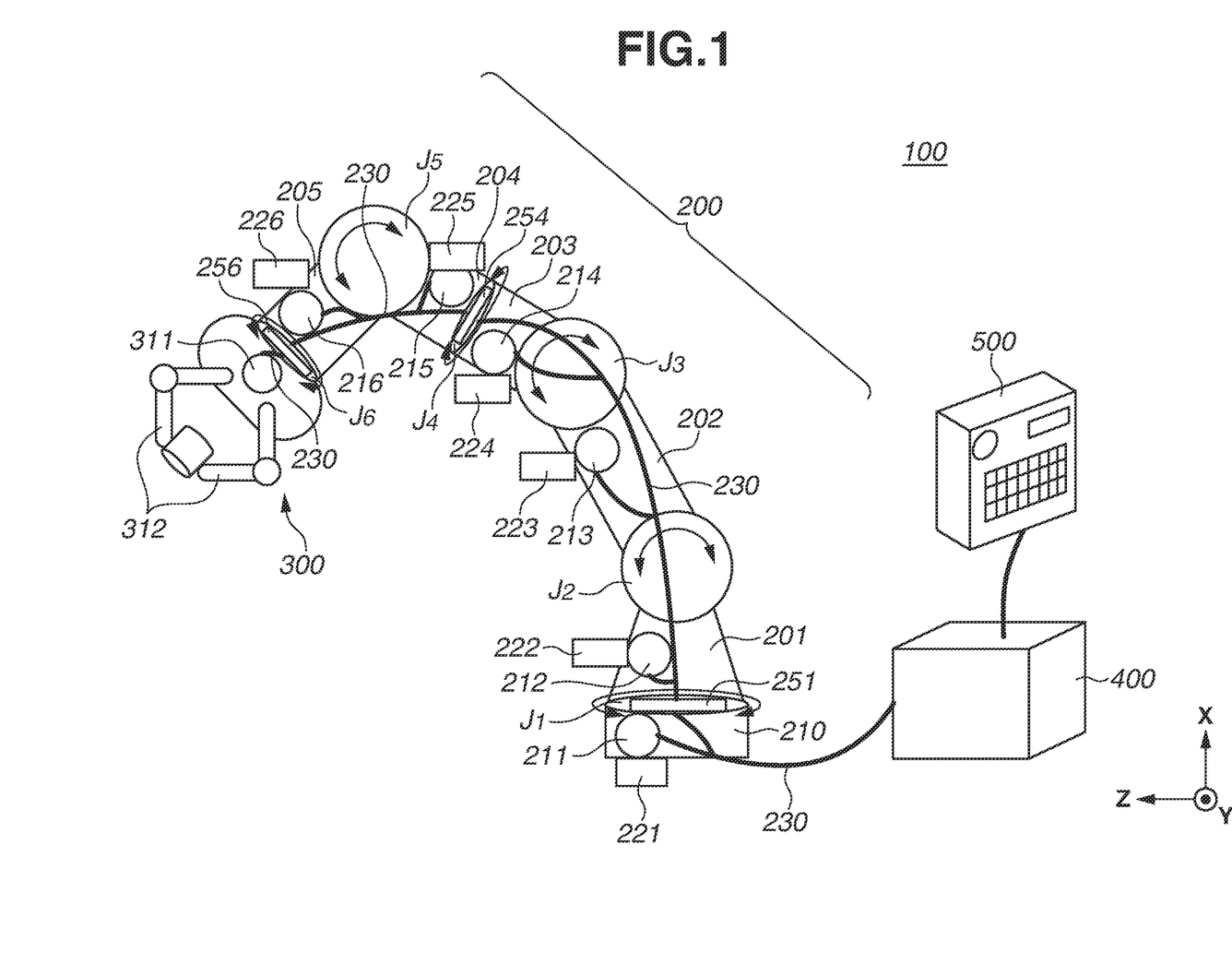
FIG. 1 illustrates a schematic view of a robot apparatus according to a first exemplary embodiment.

FIG. 1 is a plan view illustrating a robot apparatus 100 according to a first exemplary embodiment viewed from one direction in an XYZ coordinate system. Arrows X, Y, and Z illustrated in FIG. 1 indicate a coordinate system for the entirety of the robot apparatus 100. The XYZ three-dimensional coordinate system used for a robot system including a robot apparatus may normally adopt a local coordinate system appropriately used for, for example, a robot hand or a finger portion by a certain necessity of control, in addition to the global coordinate system used for the whole of an installation environment of the robot apparatus 100. In the present exemplary embodiment, the coordinate system of whole of the robot apparatus 100 is expressed by XYZ, and the local coordinate system of the robot apparatus 100 is expressed by xyz.

As illustrated in FIG. 1, the robot apparatus 100 includes an articulated robot arm body 200, a robot hand body 300, and a control device 400 that controls operations of whole of the robot apparatus 100.

The robot apparatus 100 further includes an external input device 500 as a teaching device that transmits teaching data to the control device 400. An example of the external input device 500 includes a teaching pendant. An operator uses the teaching pendant to specify a position of the robot arm body 200 or the robot hand body 300.

In the present exemplary embodiment, a robot hand is provided at the leading end portion of the robot arm body 200. However, the present exemplary embodiment is not limited thereto. For example, a tool may be provided as the end effector.

A link 201 that is a base end of the robot arm body 200, is provided at a base 210.

The robot hand body 300 grasps a target object, such as a component and a tool. The robot hand body 300 according to the present exemplary embodiment opens and closes two finger portions 312 with a driving mechanism (not illustrated) and a motor 311 to grasp or release a workpiece. The robot hand body 300 is required at least to grasp the workpiece in such a manner that the workpiece is not displaced relatively to the robot arm body 200.

The robot hand body 300 includes a hand motor driver (not illustrated) for controlling the drive of the motor 311, built therein.

The robot hand body 300 is connected with a link 205. Pivoting of the link 205 enables the robot hand body 300 to rotate with the link 205.

The robot arm body 200 includes a plurality of joints, for example, six joints (six axes). The robot arm body 200 includes a plurality of (e.g., six) motors 211 to 216 that drives the joints $J_1$ to $J_6$, respectively, rotationally around the respective rotary shafts thereof.

The robot arm body 200 further includes arm motor control devices 221 to 226 that control the motors 211 to 216, respectively. For the sake of simplification of description, the arm motor control devices 221 to 226 are illustrated outside of the robot body 200 illustrated in FIG. 1. However, the arm motor control devices 221 to 226 may be provided near the motors 211 to 216 inside the base 210 and the links 201 to 205, respectively.

The plurality of links 201 to 205 of the robot arm body 200 and the robot hand body 300 are rotatably or pivotably coupled with the joints $J_1$ to $J_6$. The links 201 to 205 are sequentially connected in series from the base end to the leading end of the robot arm body 200.

As illustrated in FIG. 1, the base 210 and the link 201 of the robot arm body 200 are connected through the joint $J_1$ that rotates in the arrow directions around the X-axis of FIG. 1. A transmission mechanism (not illustrated) transmits rotation of the motor 211, so that the link 201 can rotate in the directions of arrows around the X-axis of FIG. 1.

The link 201 and the link 202 of the robot arm body 200 are connected through the joint $J_2$ that rotates in the directions of arrows around the Y-axis of FIG. 1. A transmission mechanism (not illustrated) transmits rotation of the motor 212, so that the link 202 can pivot in the directions of arrows around the Y-axis of FIG. 1.

The link 202 and the link 203 of the robot arm body 200 are connected through the joint $J_3$ that rotates in the directions of arrows around the Y-axis of FIG. 1. A transmission mechanism (not illustrated) transmits rotation of the motor 213, so that the link 203 can pivot in the directions of arrows around the Y-axis of FIG. 1.

The link 203 and the link 204 of the robot arm body 200 are connected through the joint $J_4$ that rotates in the directions of arrows around a predetermined axis located on the XZ plane of FIG. 1. A transmission mechanism (not illustrated) transmits rotation of the motor 214, so that the link 204 can rotate in the directions of arrows around the predetermined axis located on the XZ plane of FIG. 1.

The link 204 and the link 205 of the robot arm body 200 are connected through the joint $J_5$ that rotates in the directions of arrows around the Y-axis of FIG. 1. A transmission mechanism (not illustrated) transmits rotation of the motor 215, so that the link 205 can pivot in the directions of arrows around the Y-axis of FIG. 1.

The link 205 of the robot arm body 200 and the robot hand body 300 are connected through the joint $J_6$ that rotates in the directions of arrows around a predetermined axis located on the XZ plane of FIG. 1. A transmission mechanism (not illustrated) transmits rotation of the motor 216, so that the robot hand body 300 can rotate in the directions of arrows around the predetermined axis located on the XZ plane of FIG. 1.

The control device 400 supplies power to the motors 211 to 216 and the motor 311 provided to the joints $J_1$ to $J_6$ through a power cable 230. The control device 400 according to the present exemplary embodiment additionally has a function as a power supply device that supplies power to the robot apparatus 100.

Among the joints $J_1$ to $J_6$, each of the joints $J_1$, $J_4$, and $J_6$ is applied with a wireless power supply module. The joint $J_1$ is provided with a wireless power supply module 251. The joint $J_4$ is provided with a wireless power supply module 254. The joint $J_6$ is provided with a wireless power supply module 256.

The control device 400 supplies power to the motor 211 and the wireless power supply module 251 through the power cable 230.

The wireless power supply module 251 wirelessly supplies power at the joint $J_1$ via a pair of coils.

The power supplied by the wireless power supply module 251 is supplied to the motors 212 to 214, the arm motor control devices 222 to 224, and the wireless power supply module 254 by the power cable 230 passing through the links 201 to 203.

The wireless power supply module 254 wirelessly supplies power at the joint $J_4$ via a pair of coils.

The power supplied by the wireless power supply module 254 is supplied to the motors 215 and 216, the arm motor control devices 225 and 226, and the wireless power supply module 256 by the power cable 230 passing through the links 204 and 205.

The wireless power supply module 256 wirelessly supplies power at the joint $J_6$ via a pair of coils.

The power supplied by the wireless power supply module 256 is supplied to the motor 311 by the power cable 230 passing through the robot hand body 300.

The above configuration enables removal of the power cable 230 at the joints $J_1$, $J_4$, and $J_6$, so that the joints $J_1$, $J_4$, and $J_6$ are freely rotatable.

As described above, as long as in a movable range, the robot arm body 200 can turn the end effector of the robot arm body 200 (e.g., robot hand body 300) in a predetermined direction, at any three-dimensional position in any three-dimensional posture.

A method in which the wireless power supply module 256 supplies power via a pair of coils has been described. However, the present exemplary embodiment is not limited thereto. Any technique including a magnetic resonance technique, a radiowave reception technique, an electric field coupling technique, a direct-current resonance technique, and an ultrasonic technique may be applied.

In the present exemplary embodiment, a hand portion of the robot arm body 200 corresponds to the robot hand body 300. In a case where the robot hand body 300 is grasping an object, the robot hand body 300 and the object having been grasped (e.g., a component or a tool) are referred to as the hand portion of the robot arm body 200.

In other words, regardless of whether the robot hand body 300 grasps an object, the robot hand body 300 that is the end effector is referred to as the hand portion.

As described above, the robot arm body 200 can have the robot hand body 300 move to any position and operate desired work. The desired work includes grasping a workpiece, assembling the workpiece to a predetermined workpiece, and manufacturing an article.

The robot hand body 300 may be an end effector, such as a pneumatically driven air handing unit.

The robot hand body 300 is mounted onto the link 205 by a semi-fixing unit, such as screwing, or is mounted attachably to or detachably from the link 205 by a mounting means, such as a latch.

In a case where the robot hand body 300 is attachable and detachable, the robot arm body 200 may be controlled in such a manner that the robot hand body 300 is detached and replaced with another robot hand body 300 from a plurality of types of robot hand bodies 300 disposed at a supply position.

Figure 2:
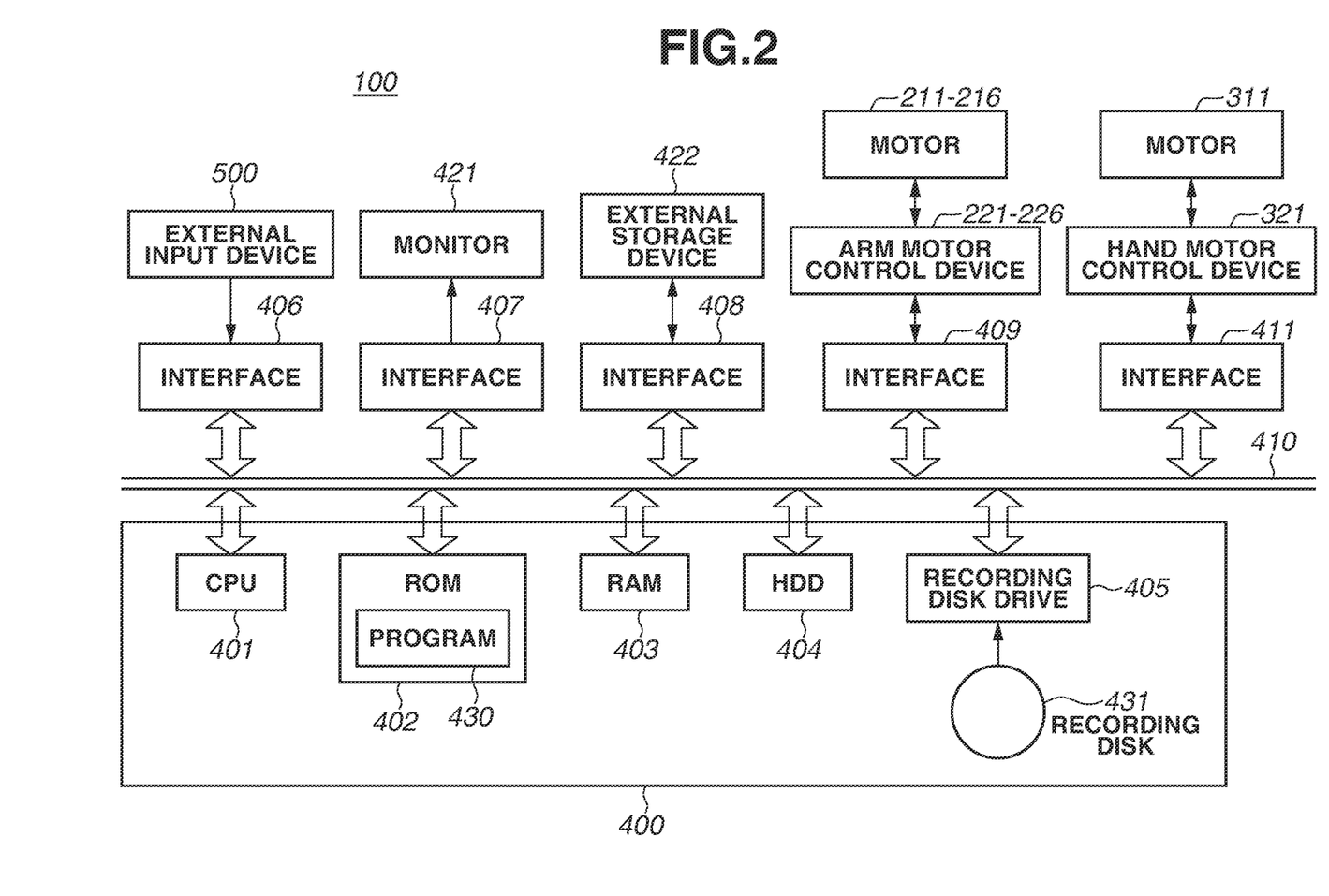
FIG. 2 is a block diagram illustrating the robot apparatus according to the first exemplary embodiment.

FIG. 2 is a block diagram illustrating the configuration of the robot apparatus 100 according to the present exemplary embodiment. The control device 400 is composed of a computer including a central processing unit (CPU) 401 as a control unit (processing unit).

The control device 400 includes, as storage units, a read only memory (ROM) 402, a random access memory (RAM) 403, and a hard disk drive (HDD) 404. The control device 400 includes a recording disk drive 405 and various interfaces 406 to 409.

The ROM 402, the RAM 403, the HDD 404, the recording disk drive 405, and the various interfaces 406 to 409 are connected to the CPU 401 via a bus 410.

The ROM 402 stores a program 430 for causing the CPU 401 to perform arithmetic processing. The CPU 401 executes each processing included in a robot control method based on the program 430 recorded (stored) in the ROM 402.

The RAM 403 is a storage device that temporarily stores various types of data, such as arithmetic processing results of the CPU 401.

The HDD 404 is a storage device that stores, for example, arithmetic processing results of the CPU 401 and various types of data acquired from outside of the control device 400.

The recording disk drive 405 can read, for example, various types of data and a program recorded in a recording disk 431.

The external input device 500 is connected to an interface 406. The CPU 401 receives input of teaching data from the external input device 500 via the interface 406 and the bus 410.

Each of the arm motor control devices 221 to 226 is connected to the interface 409. The CPU 401 outputs data of a command value for each joint to the arm motor control devices 221 to 226 at predetermined time intervals via the bus 410 and the interface 409.

Similarly, a hand motor control device 321, which controls the drive of the motor 311 for the robot hand body 300, is connected to an interface 411 so that the hand motor control device 321 can communicate with the CPU 401 via the bus 410. The CPU 401 outputs data of a command value for each finger portion 312 to the hand motor control device 321 at predetermined time intervals via the bus 410 and the interface 411.

The interface 407 is connected with a monitor 421. Various images are displayed on the monitor 421 under control of the CPU 401. The interface 408 is connectable to an external storage device 422 that is a storage unit, such as a rewritable nonvolatile memory and an external HDD.

In the present exemplary embodiment, the HDD 404 is a computer-readable recording medium that stores the program 430. However, the present exemplary embodiment is not limited thereto. The program 430 may be recorded in any computer-readable recording medium.

A recording medium configured to supply the program 430 may include the ROM 402, the recording disk 431, and the external storage device 422. Specific examples of the recording medium may include a flexible disk, a hard disk, an optical disc, a magneto-optical disc, a compact disc read only memory (CD-ROM), a compact disc recordable (CD-R), a magnetic tape, a nonvolatile memory, and a ROM.

Each of the motors 211 to 216 and 311 is provided with a motor encoder that detects the rotation position of the rotary shaft of each of the motor. Each motor encoder is communicable with the CPU 401 via the corresponding interface described above.

The CPU 401 can feedback-control the position of each link, using a detected value from the motor encoder provided at each motor.

Figure 3:
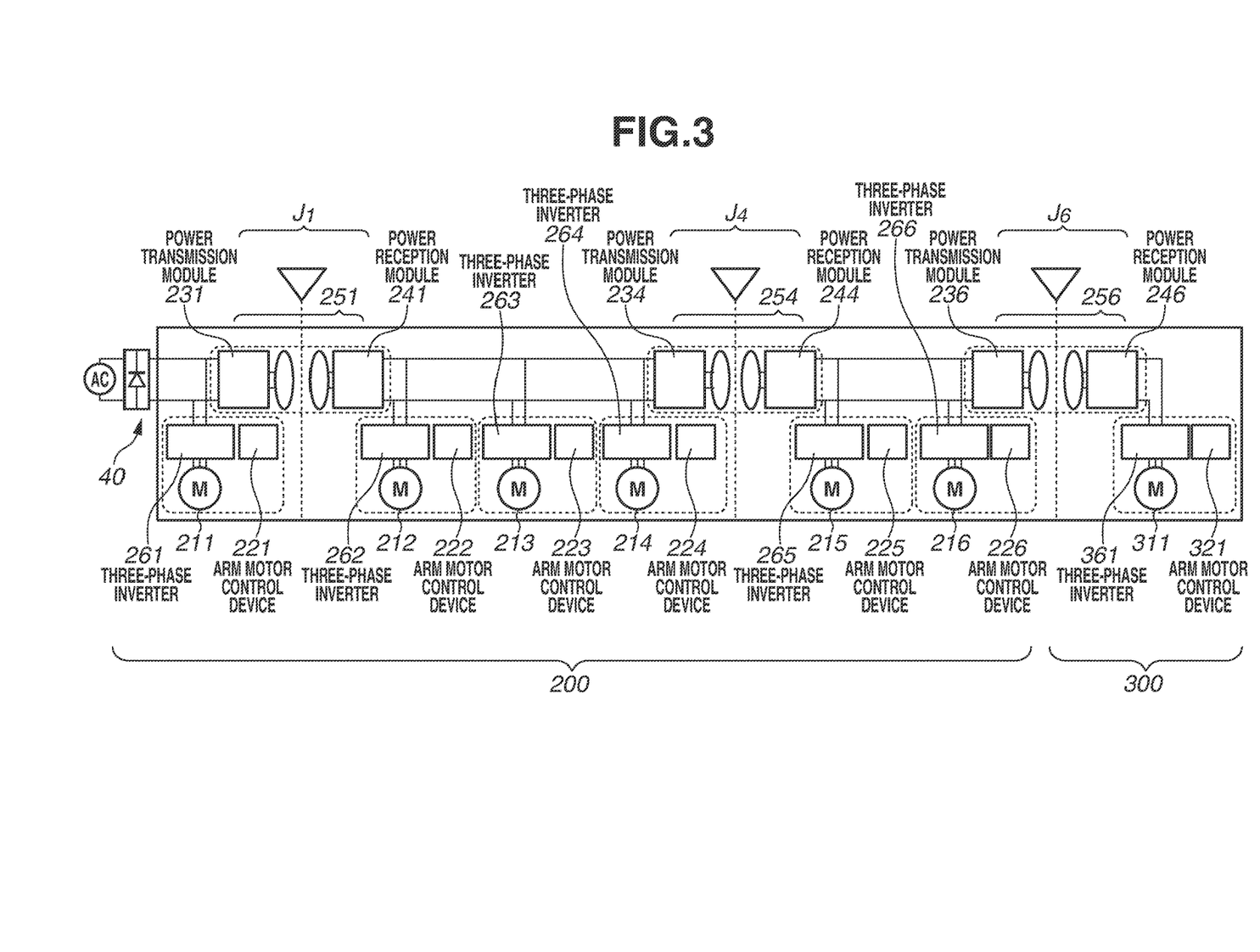
FIG. 3 is a block diagram illustrating each motor of the robot apparatus according to the first exemplary embodiment.

FIG. 3 is a block diagram illustrating the respective power flows of the motors 211 to 216 provided inside the robot arm body 200.

In the present exemplary embodiment, three-phase inverters 261 to 266 that drive the motors 211 to 216, respectively, and the arm motor control devices 221 to 226 are provided inside the robot arm body 200.

Similarly, a three-phase inverter 361 that drives the motor 311 and the hand motor control device 321 are provided inside the robot hand body 300.

The joints $J_1$, $J_4$, and $J_6$ are respectively provided with the wireless power supply modules 251, 254, and 256, each of which uses magnetic coupling between two coils.

The wireless power supply modules 251, 254, and 256 include power transmission modules 231, 234, and 236, respectively. The wireless power supply modules 251, 254, and 256 further include power reception modules 241, 244, and 246, respectively. The wireless power supply modules will be described in detail below.

Figure 4:
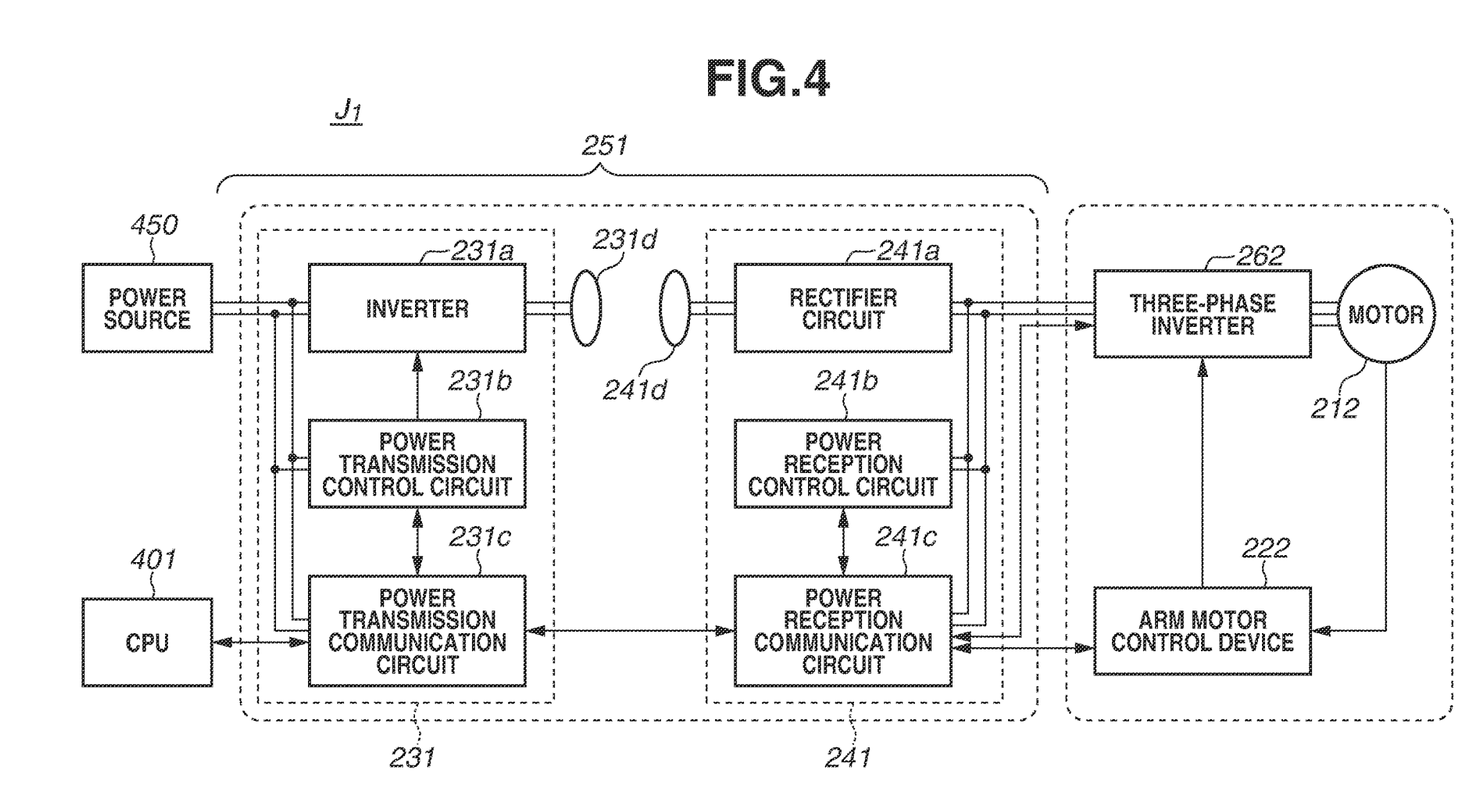
FIG. 4 is a block diagram illustrating a configuration of a joint including a wireless power supply module according to the first exemplary embodiment.

FIG. 4 is a block diagram illustrating the configuration of the joint $J_1$ having the wireless power supply module 251. The wireless power supply module 251 will be described as an example. The wireless power supply modules 254 and 256 are similar in configuration to the wireless power supply module 251.

As described in FIG. 4, the power transmission module 231 includes an inverter 231a, a power transmission control circuit 231b, a power transmission communication circuit 231c, and a power transmission coil 231d.

The power reception module 241 includes a rectifier circuit 241a, a power reception control circuit 241b, a power reception communication circuit 241c, and a power reception coil 241d.

In FIG. 4, each solid line indicates a power supply line, and each arrow indicates a signal supply line.

The control device 400 includes a power source 450 and the CPU 401. The CPU 401 sends a command value to each wireless power supply module and each arm motor control device.

As described in FIG. 4, the power transmission control circuit 231b equipped in the power transmission module 231 is provided between the power source 450 and the power transmission coil 231d. The power transmission control circuit 231b converts supplied direct-current power into alternating-current power, using the inverter 231a, and supplies the alternating-current power to the power transmission coil 231d.

The power transmission communication circuit 231c transmits a signal of controlling each motor received from the CPU 401 to the power reception communication circuit 241c. Communication between the power transmission communication circuit 231c and the power reception communication circuit 241c is wirelessly performed with a publicly known wireless communication technique.

The signal of controlling each motor indicates, for example, command values for the speed of rotation and the position of rotation of the motor.

The power reception coil 241d is disposed opposite to the power transmission coil 231d. The power reception coil 241d receives the alternating-current power sent from the power transmission coil 231d.

The power reception control circuit 241b converts the alternating-current power received by the power reception coil 241d into direct-current power, using the rectifier circuit 241a, to output the direct-current power to the motor 212 and the arm motor control device 222.

The power reception communication circuit 241c receives the signal transmitted from the power transmission communication circuit 231c, and transmit the signal to the arm motor control device 222.

Based on the received signal, the arm motor control device 222 controls the drive of the motor 212 using, for example, the three-phase inverter 262.

As described above, the motor 212 is supplied with the power by the wireless power supply module 251. The direct-current power output from the power reception coil 241d comes close is not only supplied to the motor 212 but also to the wireless power supply modules 254 and 256 provided at the other joints and the motors 213 to 216 for the joints.

In the present exemplary embodiment, the power transmission coil 231d is provided at the base 210, and the power reception coil 241d is provided at the link 201.

In this case, the base 210 and the link 201 move relatively due to the motor 211. The power transmission coil 231d and the power reception coil 241d are provided in such a manner that the power transmission coil 231d and the power reception coil 241d remain opposite to each other even when the operation is carried out.

In addition, each of the motor 212 and the arm motor control device 222 includes a battery not illustrated. Furthermore, the power reception module 241 includes a battery not illustrated. These batteries accumulate the power.

Figure 5:
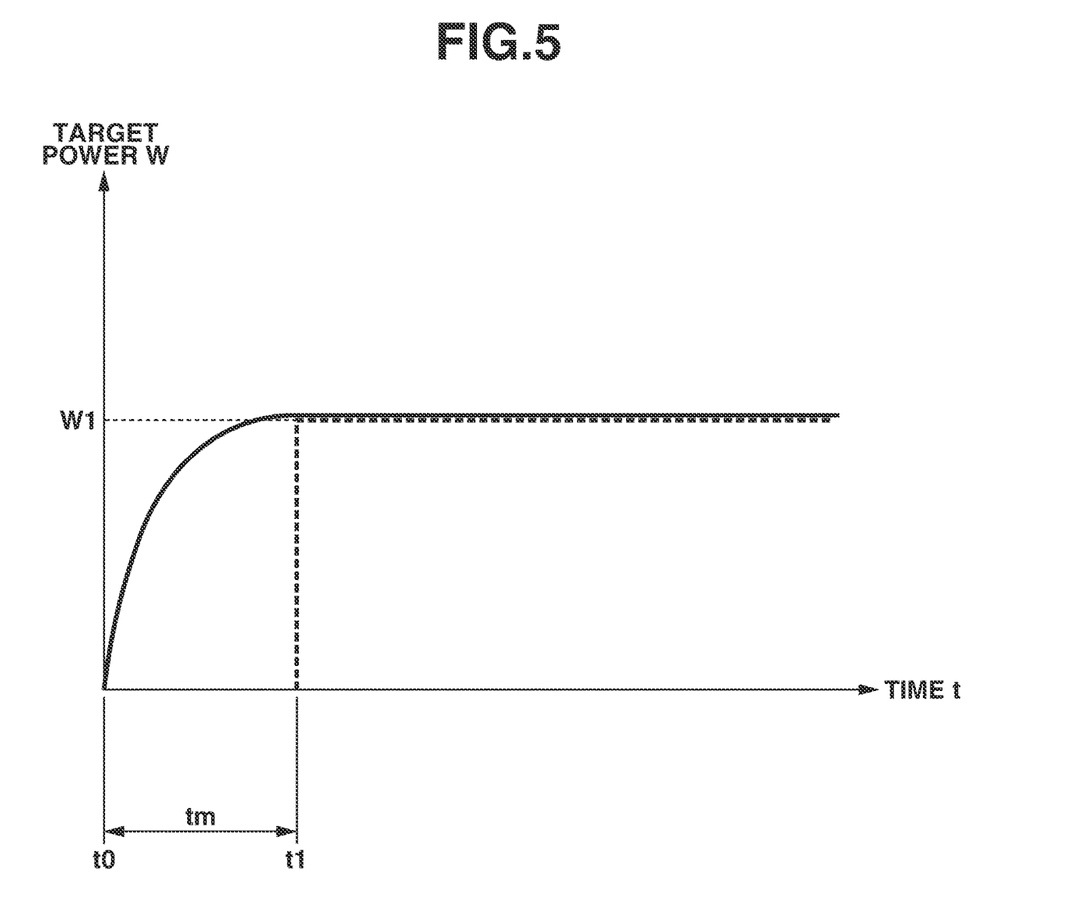
FIG. 5 is a graph illustrating a timing chart of power used to calculate a control parameter for power control according to the first exemplary embodiment.

Power control according to the present exemplary embodiment will be described. FIG. 5 is a graph illustrating a power timing chart to calculate a control parameter for the power control according to the present exemplary embodiment. In FIG. 5, the horizontal axis indicates time t, and the vertical axis indicates consumable power W. The graph illustrated with a solid line indicates the variation of power to be supplied from the power transmission module 231 to the power reception module 241.

Figure 6:
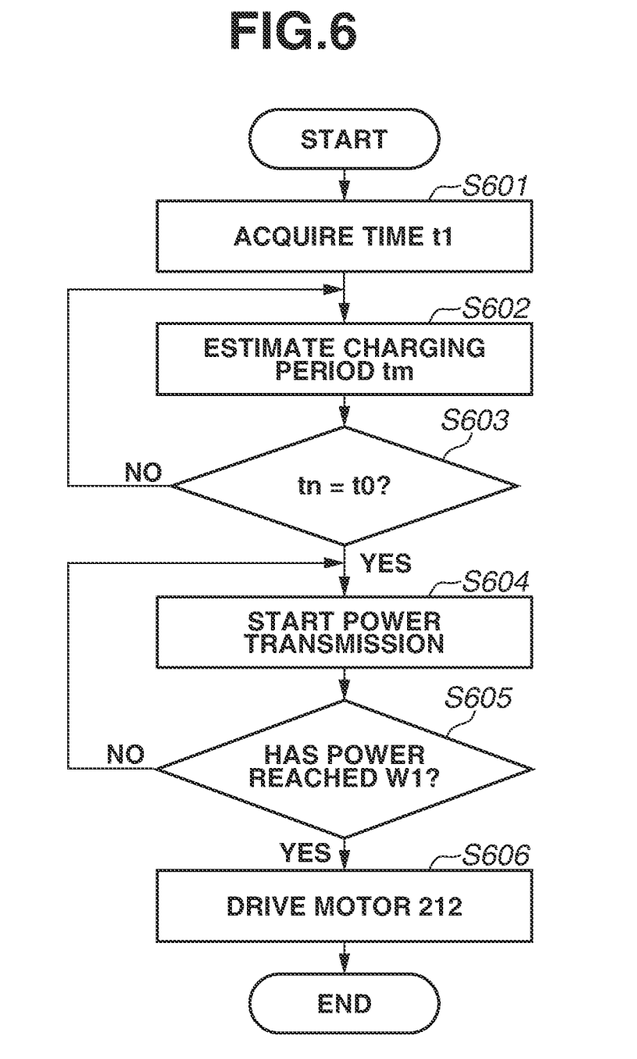
FIG. 6 illustrates a flowchart for performing the power control according to the first exemplary embodiment.

FIG. 6 is a flowchart for the power control according to the present exemplary embodiment.

Referring to FIG. 5, W1 represents power necessary for driving each motor. Time t1 represents the timing at which each motor is driven.

Time t1 is known from previously set trajectory data of the robot arm body 200. This arrangement enables the power transmission module 231 to start power supply at time t0 before the timing at which each motor needs the power.

As illustrated in FIG. 5, start of transmission of power at time t0 enables the power transmission module 231 to supply the necessary power W1 to the power reception module 241 at time t1 that is the timing at which the motor is driven.

This arrangement enables reduction of temporary shortage of the power that the power reception module receives at the timing when the driving source drives.

Next, a method of obtaining time t0 that is the timing when power is transmitted, will be described in detail. In the present exemplary embodiment, time t0 is obtained from the capacity C of the battery in each motor or each power reception module, residual voltage Vc, power supply current A, and power supply voltage Vs.

Here, the time span from time t0 to t1 is defined as charging period tm that is a period during which the capacitance component is electrically charged in the battery in each motor or each power reception module.

The power transmitted to each motor or each power reception module, is also charged into the component of capacitance in the battery during the power transmission. Thus, the charging period tin occurs.

Detection of the parameters described above in advance enables the necessary charging period tm to be calculated from the following formula (1).

$$tm = C \times (Vs - Vc)/A \quad (1)$$

When the power control is performed in practice, the calculated charging period tm may be corrected with a correction value with consideration of a detection error.

If each motor or each power reception module has a unique characteristic, the charging period tm may be obtained by a different method. The charging period tm may be set as a fixed value from the unique characteristic of each motor or each power reception module.

The charging period tin is subtracted from time t1 that is known from the trajectory data of the robot arm body 200. Thus, time t0 that is the timing of starting power transmission can be calculated.

Next, the flowchart for the power control according to the present exemplary embodiment, will be described with reference to FIG. 6. The control to be described in FIG. 6 is performed by the CPU 401.

In step S601, time t1, which is the drive timing of each motor, is acquired based on the trajectory data of the robot arm body 200.

In step S602, the charging period tm and time t0 that is the timing at which power transmission starts, are calculated by the method described with FIG. 5.

In step S603, it is determined whether the current time m is time t0 that is the timing at which power transmission starts.

In a case where determination indicates that tn=t0 (YES in step S603), the processing proceeds to step S604. In a case where the determination indicates that tn is not equal to t0 (NO in step S603), the processing returns to step S602.

If the current time tn is not time t0 that is the timing at which power transmission starts, the processing returns to step S602, and then the charging period tm is calculated again.

This is because the parameters of each motor or each power reception module vary due to the elapse of time, resulting in variation of the charging period tm.

In step S604, the power transmission coil 231d transmits power to the power reception coil 241d through.

In step S605, it is determined whether the transmitted power has reached W1 that is a target value. If the transmitted power has not reached W1 that is the target value (NO in step S605), the processing returns to step S604, and power transmission is performed again.

If the transmitted power has reached W1 that is the target value (YES in step S605), the processing proceeds to step S606.

In step S606, the motor 212 is driven with the supplied power. Accordingly, the flow of the power control ends.

As described above, the power to be transmitted by the power transmission module is controlled in such a manner that the power reception module has received the target power at the timing at which the motor is driven.

This arrangement enables necessary power to be supplied at necessary timing. Thus, temporary power shortage can be avoided when the motor is driven, with reduction of power consumption.

In the present exemplary embodiment, it is determined, in step S603, whether the current time m agrees with time t0 that is the timing at which power transmission starts. However, the present exemplary embodiment is not limited thereto.

For example, it may be determined whether the current time tn exists in the time between time t0-a (seconds) and time t0. This arrangement enables power transmission to start reliably.

-a (seconds) may be a fixed value or may be acquired by calculation.

In the present exemplary embodiment, the power control to one motor has been described. However, the present exemplary embodiment is not limited thereto. For example, in a case of simultaneous drive of a plurality of motors, the CPU 401 may calculate and add the respective amounts of power that each of the plurality of motors needs. The CPU 401 may then control the amount of power transmission in such a manner that the added amount of power is charged in the battery of a predetermined power reception module at the timing when the plurality of motors drives simultaneously.

In a case where power is transmitted to a motor at a place where power is transmitted through a plurality of wireless power supply modules (e.g., the motor 311 that controls the robot hand body 300), the amount of power transmission may be controlled considering a power loss in each wireless power supply module.

In a case of the motor 311, the power is transmitted through the three wireless power supply modules 251, 254, and 256. In that case, the CPU 401 may calculate the power to be lost in each wireless power supply module, and may transmit a generous amount of power to the wireless power supply module 251 to be charged first.

In the present exemplary embodiment, the target power is charged in the power reception module. However, the present exemplary embodiment is not limited thereto. For example, the battery in the motor or the arm motor control device may be directly charged.

In the first exemplary embodiment, the example in which the target power W1 does not vary has been described. However, the target power W1 may vary due to, for example, a variation in the ambient temperature of the robot apparatus 100, deterioration in the drive efficiency of a motor due to wear, and variations in the weights of products to be handled.

In a second exemplary embodiment, even in a case where target power varies, temporary power shortage can be avoided when a motor is driven, with reduction of power consumption.

Elements in the configurations of hardware and a control system different from those according to the first exemplary embodiment will be described below with reference to drawings. Elements similar to those according to the first exemplary embodiment are regarded as similar in configuration to the above and as capable of functioning similarly to the above, and thus the detailed descriptions thereof will be omitted.

Figure 7:
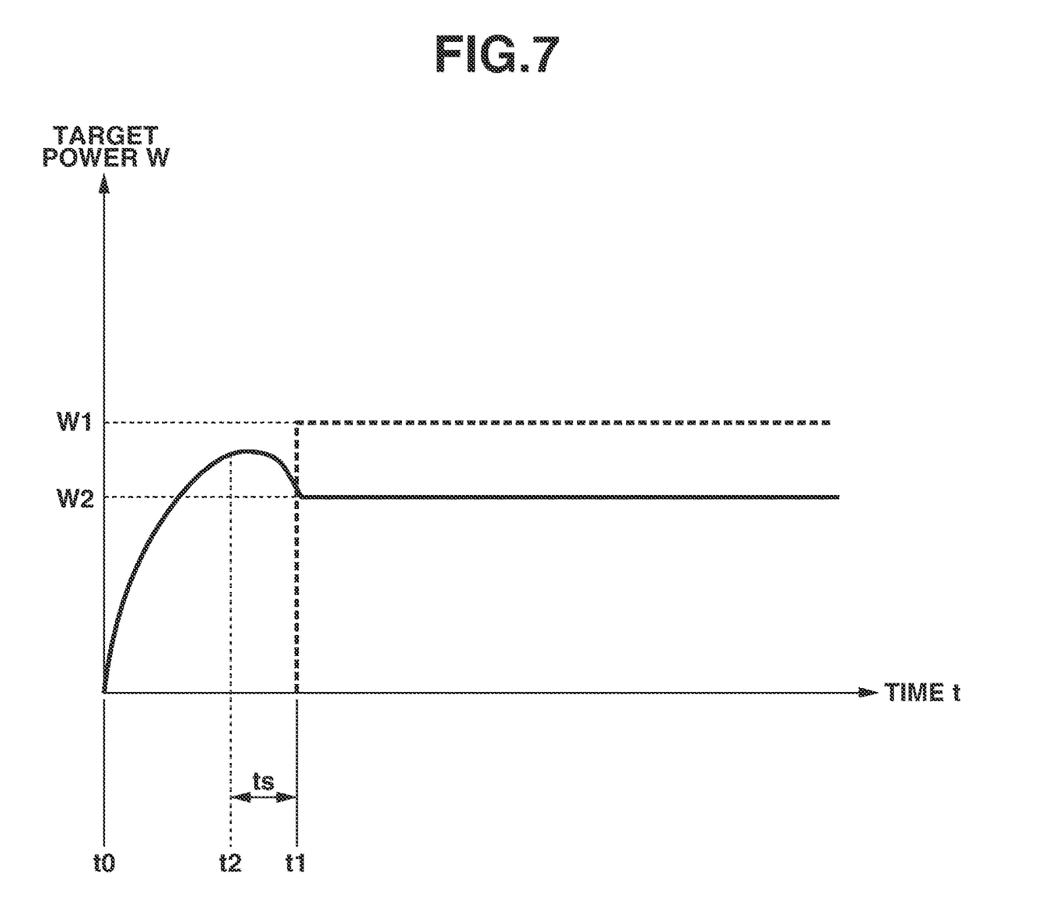
FIG. 7 is a graph illustrating a timing chart of power used to calculate a control parameter for power control according to a second exemplary embodiment.

FIG. 7 illustrates a power timing chart used for calculating a control parameter to perform power control according to the second exemplary embodiment. In FIG. 7, the horizontal axis indicates time t, and the vertical axis indicates consumable power W. A graph illustrated with a solid line indicates the variation of power to be supplied from a power transmission module 231 to a power reception module 241.

In the present exemplary embodiment, the value of power supplied to the power reception module 241 is fed back to a power transmission control circuit 231*b*. This arrangement enables detection of how much power is currently transmitted to the power reception module 241.

Referring to FIG. 7, the target power varies from W1 to W2 at time t2.

In this case, the power transmission control circuit 231*b* obtains power transmission change period is using the formula (1) described in the first exemplary embodiment, based on time t2 at which the target power varies.

During the power transmission change period ts, the power transmission control circuit 231*b* changes the power to be transmitted in such a manner that the power becomes W2 at time t1 that is the timing at which the motor is to be driven.

Figure 8:
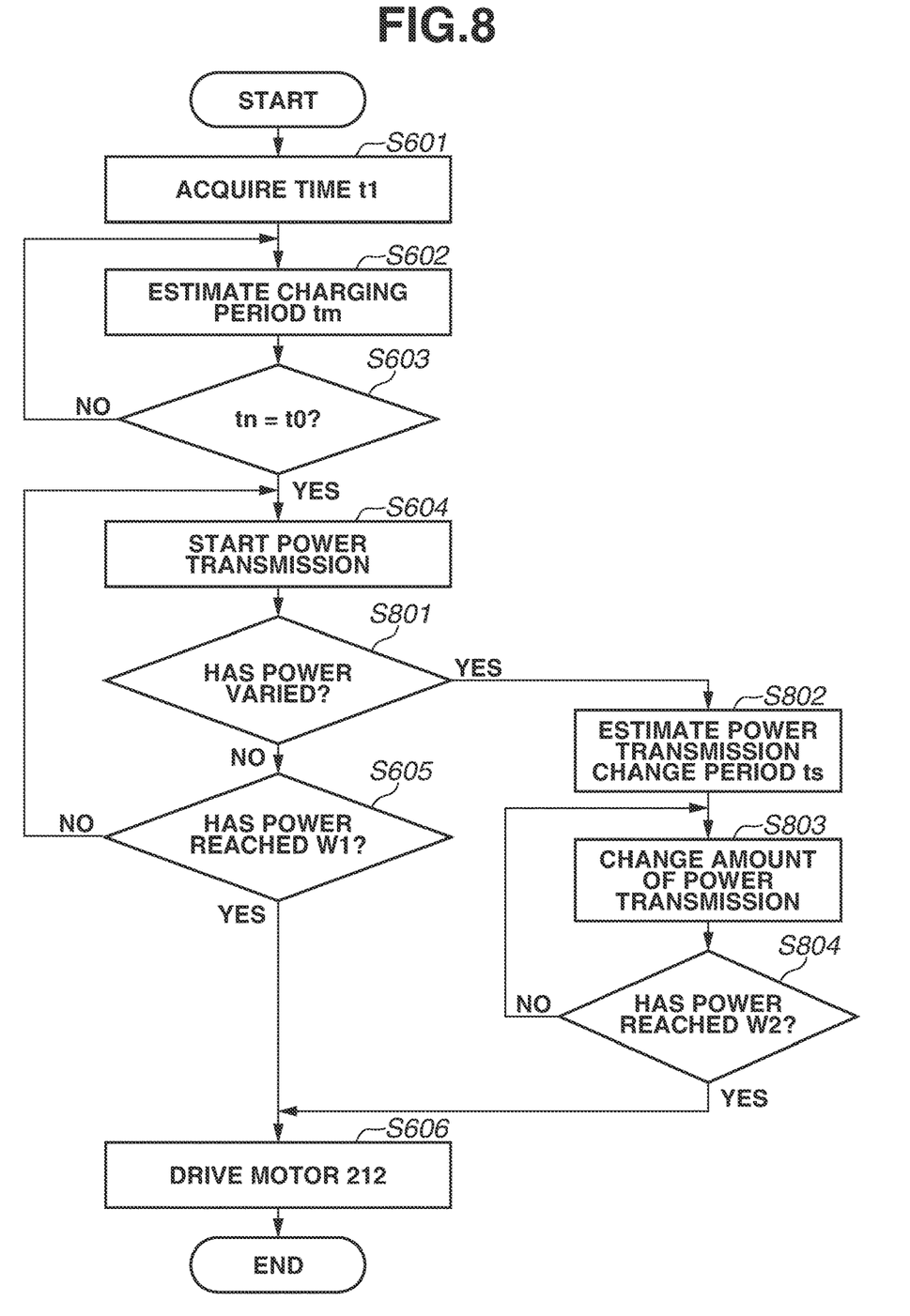
FIG. 8 illustrates a flowchart for performing the power control according to the second exemplary embodiment.

FIG. 8 is a flowchart for the power control according to the present exemplary embodiment. A difference from the flowchart illustrated in FIG. 6 is addition of steps S801, S802, S803, and S804. The difference will be described in detail below.

Referring to FIG. 8, a charging period tm is estimated in step S602, and power transmission starts at time t0. In step S801, it is detected whether the target power has varied.

If the target power has not varied (NO in step S801), the processing proceeds to step S605, and the flow described in FIG. 6 is performed.

If the target power has varied (YES in step S801), the processing proceeds to step S802.

In step S802, the power transmission change period ts described with reference to FIG. 7 is estimated.

In step S803, the amount of power transmission is changed based on the power transmission change period ts in such a manner that the power to be transmitted becomes W2 at time t1.

In step S804, it is determined whether the transmitted power is W2.

If the transmitted power is not W2 (NO in step S804), the processing returns to step S803, and the operation of power transmission continues.

If the transmitted power is W2 (YES in step S804), the processing proceeds to step S606, and drive the motor 212, and the flow of the power control ends.

As described above, according to the present exemplary embodiment, even in a case where the target power varies, the power to be transmitted is changed so that the target power can be followed up. Thus, temporary power shortage can be avoided when the motor is driven, with reduction of power consumption.

The example in which the target power decreases from W1 to W2 has been given above. However, the present exemplary embodiment is not limited thereto, and thus can be applied to a case where the target power increases.

In each of the first and second exemplary embodiments, the processing procedure to be performed by the CPU 401 has been specifically described. However, a recording medium in which a software control program capable of performing the functioning is recorded may be installed on the wireless power supply module for achievement of each exemplary embodiment.

For example, the power transmission control circuit 231*b* of the power transmission module 231 is formed of a microcomputer. The power transmission control circuit 231*b* then stores the drive timing of the motor and the amount of power necessary thereat.

When the chive timing of the motor comes close, the power transmission control circuit 231*b* sends a command value for the necessary amount of power to the CPU 401 through the power transmission communication circuit 231*c*, to request the necessary amount of power from the power source 450. Thus, each exemplary embodiment can be achieved.

Alternatively, the power reception control circuit 241*b* of the power reception module 241 may be formed of, for example, a microcomputer, to achieve each exemplary embodiment. Similarly to the power transmission control circuit 231*b*, the power reception control circuit 241*b* stores the drive timing of the motor and the amount of power necessary thereat.

When the drive timing of the motor comes close, the power reception control circuit 241*b* sends a command value for the necessary amount of power to the CPU 401 through the power reception communication circuit 241*c*, to request the necessary amount of power from the power source 450 and the power transmission control circuit 231*b*. Thus, each exemplary embodiment can be achieved.

Therefore, the software control program capable of performing the functioning, the recording medium in which the software control program is recorded, and the wireless power supply module are included within the scope of the present disclosure.

In each exemplary embodiment, the case where the computer-readable recoding medium is a ROM or a RAM, and the control program is stored in the ROM or the RAM, has been described. However, the present disclosure is not limited to the exemplary embodiments.

The control program for achieving each exemplary embodiment of the present disclosure, may be recorded in any computer-readable recording medium. Examples of a recording medium for supplying the control program may include an HDD, an external storage device, and a recording disk.

In each of the first and second exemplary embodiments, the robot apparatus 100 including an articulated robot arm having a plurality of joints, has been described. However, the number of joints is not limited thereto. As a type of robot apparatus, a vertical multi-axis configuration has been given. However, a different joint type, such as a parallel link type, enables achievement of a configuration equivalent to those described above.

In each of the first and second exemplary embodiments, the exemplary configuration of the robot apparatus 100 has been given with the illustrations. However, the robot apparatus 100 is not limited thereto, and thus those skilled in the art may make alterations optionally. Each motor provided in the robot apparatus 100 is not limited to the configuration. The driving source that drives each joint may be a device such as an artificial muscle.

The first and second exemplary embodiments can be applied to a machine capable of, for example, automatically performing the operation of expansion and contraction, bending and stretching, upward and downward movement, left and right movement, whirling, or any combination thereof, based on information stored in a storage device provided at a control device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, and an optical disk (such as a compact disc (CD), digital versatile disc (DVD), or Blu-ray Disc (BD)™).

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-241865, filed Dec. 25, 2018, which is hereby incorporated by reference herein in its entirety.

What is claimed is:

1. A robot apparatus equipped with a robot body that includes a driving source that receives power, the robot apparatus comprising:
  a power transmission module configured to transmit power;
  a power reception module configured to receive the power transmitted by the power transmission module and supply the received power to the driving source; and
  a control device configured to:
  acquire, based on trajectory data concerning the robot body, an operation timing at which the driving source is to be driven;
  acquire a charging time period needed for predetermined power transmitted by the power transmission module to (i) be received by the power reception module and (ii) charge a component of the power reception module; and
  set, by using the charging time period, a power transmission start timing at which the power transmission module is to start to transmit the predetermined power to the power reception module, so that the driving source is able to be driven at the operation timing.

2. The robot apparatus according to claim 1, wherein the control device obtains the power transmission start timing based on the operation timing.

3. The robot apparatus according to claim 1, wherein the control device obtains the power transmission start timing based on the operation timing and a parameter regarding the power reception module.

4. The robot apparatus according to claim 3, wherein the control device obtains the power transmission start timing based on the operation timing, the parameter regarding the power reception module, and a parameter regarding the driving source.

5. The robot apparatus according to claim 1, wherein the control device changes an amount of power to be transmitted, in a case where the predetermined power varies while the power transmission module is transmitting the power.

6. The robot apparatus according to claim 5, wherein the control device changes the amount of power to be transmitted based on a variation timing at which the predetermined power varies and the operation timing.

7. The robot apparatus according to claim 5, wherein the control device changes the amount of power to be transmitted based on a variation timing at which the predetermined power varies, the operation timing, and a parameter regarding the power reception module.

8. The robot apparatus according to claim 7, wherein the control device changes the amount of power to be transmitted based on the variation timing, the operation timing, the parameter regarding the power reception module, and a parameter regarding the driving source.

9. The robot apparatus according to claim 1, wherein the robot body is a robot arm, and the trajectory data is trajectory data of the robot arm, and the operation timing that the control device acquires is based on trajectory data of the robot arm.

10. The robot apparatus according to claim 1,
  wherein the power transmission module includes a power transmission coil,
  wherein the power reception module includes a power reception coil, and
  wherein the power transmission coil and the power reception coil are provided at positions relative to one another such that the positions of the power transmission coil and the power reception coil remain opposite to each other throughout various movements of the robot apparatus.

11. A method of controlling a robot apparatus equipped with a robot body that includes a driving source that receives power, the robot apparatus including a power transmission module configured to transmit power, and a power reception module configured to receive the power transmitted by the power transmission module and to supply the power to the driving source,
  the method comprising:
  acquiring, based on trajectory data concerning the robot body, an operation timing at which the driving source is to be driven;
  acquiring a charging time period needed for predetermined power transmitted by the power transmission module to (i) be received by the power reception module and (ii) charge a component of the power reception module; and
  setting, by using the charging time period, a power transmission start timing at which the power transmission module is to start to transmit the predetermined power to the power reception module, so that the driving source is able to be driven at the operation timing.

12. A power transmission module that transmits power to a robot body including a driving source, the power transmission module comprising:
  a control device configured to
  acquire, based on trajectory data concerning the robot body, an operation timing at which the driving source is to be driven;

acquire a charging time period needed for predetermined power transmitted by the power transmission module to (i) be received by the power reception module and (ii) charge a component of the power reception module; and set, by using the charging time period, a power transmission start timing at which the power transmission module is to start to transmit the predetermined power to the power reception module, so that the driving source is able to be driven at the operation timing.

13. A power reception module that is disposed in a robot body that includes a driving source that receives power from a power source, the power reception module supplying the power to the driving source, and the power reception module comprising:

a control device configured to acquire, based on trajectory data concerning the robot body, an operation timing at which the driving source is to be driven;

acquire a charging time period needed for predetermined power transmitted by the power transmission module to (i) be received by the power reception module and (ii) charge a component of the power reception module; and output, by using the charging time period, a power transmission start timing at which the power transmission module is to start to transmit the predetermined power to the power reception module, so that the driving source is able to be driven at the operation timing.

14. A power supply method for a wireless power supply module that includes a power transmission module configured to transmit power to a robot body that includes a driving source that receives power, and a power reception module configured to receive the power from the power transmission module and to supply the received power to the driving source;

the power supply method comprising:

acquiring, based on trajectory data concerning the robot body, an operation timing at which the driving source is to be driven;

acquiring a charging time period needed for predetermined power transmitted by the power transmission module to (i) be received by the power reception module and (ii) charge a component of the power reception module; and setting, by using the charging time period, a power transmission start timing at which the power transmission module is to start to transmit the predetermined power to the power reception module, so that the driving source is able to be driven at the operation timing.

15. A method of manufacturing an article using the robot apparatus according to claim 1.

16. A non-transitory computer-readable storage medium storing a control program for performing the method of controlling a robot apparatus according to claim 11.

17. The robot apparatus according to claim 1, wherein the robot body is a robot arm, the robot arm includes a plurality of joints, and the power transmission module and the power reception module are disposed at some of the plurality of joints.

18. The robot apparatus according to claim 17, wherein the some of the plurality of joints are at least one of a first joint, a third joint, and a sixth joint from a side on which the robot arm is disposed.

19. The robot apparatus according to claim 17, wherein each of the some of the plurality of joints at which the power transmission module and the power reception module are disposed, is freely rotatable.

20. The robot apparatus according to claim 17, wherein the power transmission module that is disposed at the some of the plurality of joints and supplies power for operating the driving source is connected to a power cable.

21. The robot apparatus according to claim 3, wherein the parameter regarding the power reception module includes at least one of a capacity of a battery of the power reception module, a residual voltage, a power supply current, and a power supply voltage.

22. The robot apparatus according to claim 1, wherein the power transmission module transmits power and the power reception module receives power by using any one of a magnetic resonance method, a radiowave reception method, an electric field coupling method, a direct-current resonance method, and an ultrasonic method.

23. The robot apparatus according to claim 1, wherein the control device further functions as a power source device that supplies power.

24. The robot apparatus according to claim 17,
wherein the robot arm includes a plurality of driving sources as the driving source, and
wherein, in a case where there are two or more driving sources that operate at a same operation timing among the plurality of driving sources, the control device controls the power transmission start timing in such a manner that the power reception module is in a state that the power reception module receives, as the predetermined power at the operation timing, power that is needed for causing the two or more driving sources that operate at the same operation timing to operate.

25. The robot apparatus according to claim 3, wherein, based on the parameter regarding the power reception module, the control device acquires a charging period that is needed for the power reception module to go into the state in which the power reception module receives the predetermined power, and, based on the charging period, the control device acquires the power transmission start timing.

26. The robot apparatus according to claim 25, wherein, based on a detection error concerning the parameter regarding the power reception module, the control device corrects the charging period.

27. The robot apparatus according to claim 1, wherein the control device sets a time that is at least the charging time period before the operation timing as the power transmission start timing, using the operation timing and the charging time period, and the power transmission module starts transmitting power to the power reception module at the power transmission start timing.

28. The robot apparatus according to claim 1, wherein the control device acquires the charging time period based on a capacity of a battery of the power reception module, a residual voltage, a power supply current, and a power supply voltage, and controls the power transmission start timing based on the operation timing and the charging time period.

29. The robot apparatus according to claim 1, wherein the control device acquires the charging time period based on a capacity of a battery of the power reception module, a residual voltage, a power supply current, and a power supply voltage, and obtains the power transmission start timing by subtracting the charging time period from the operation timing.

30. The robot apparatus according to claim 1, wherein the control device sets the power transmission start timing based on the operation timing and the charging time period, and transmits the power to the power reception module in such a manner that the predetermined power is (i) received by the power reception module and (ii) charges the component of the power reception module, prior to the operation timing at which the driving source is to be driven.

31. The robot apparatus according to claim 28, wherein, in a case where the capacity is represented by C, the residual voltage is represented by Vc, and the time taken for the predetermined power is received by the power reception module is represented by tm, the control device acquires the charging period by the following formula: $tm = C \times (Vs - Vc) \div A$.

* * * * *